United States Patent [19]

Fayter, Jr.

[11] 4,321,406
[45] Mar. 23, 1982

[54] VINYLCYCLOPROPANE MONOMERS AND OLIGOMERS

[75] Inventor: Richard G. Fayter, Jr., Fairfield, Ohio

[73] Assignee: Emery Industries, Inc., Cincinnati, Ohio

[21] Appl. No.: 169,537

[22] Filed: Jul. 17, 1980

[51] Int. Cl.³ .................................................. C07C 69/743
[52] U.S. Cl. ....................................... 560/124; 430/287; 528/422
[58] Field of Search ................................ 560/116, 124

[56] References Cited

U.S. PATENT DOCUMENTS 3,658,879  4/1972  Julia ........................................ 560/124
3,925,460 12/1975  Henrick et al. ...................... 560/124

Primary Examiner—G. T. Breitenstein
Attorney, Agent, or Firm—Kenneth D. Tremain

[57] ABSTRACT

Vinylcyclopropane monomers and oligomers, obtained by the reaction of a diol or ether diol with 2-vinylcyclopropane-1,1-dicarboxylic acid or a lower alkyl ester thereof, are provided. These products are highly reactive and useful for the preparation of photocurable films, coatings and inks and in other related applications.

9 Claims, No Drawings

VINYLCYCLOPROPANE MONOMERS AND OLIGOMERS

BACKGROUND OF THE INVENTION

Numerous vinyl monomers possessing excellent reactivity toward free radical polymerizations are known and widely used throughout the industry for a variety of publications. Reactions involving these monomers can be initiated thermally, with chemical initiators, photochemically or using other forms of radiation, or by a combination of these methods.

In recent years increasing emphasis has been placed on the development of photocurable solventless coating and ink systems. Such systems are environmentally desirable since they do not require the use of organic solvents which often require special handling and ventilation and, upon evaporation, pollute the atmosphere. Also, since a simple light source is generally sufficient to cure such materials a substantial energy savings (50–80% reduction) can be realized compared to conventional oven curing. Additionally, photocurable systems are readily adaptable for use with heat-sensitive substrates, such as plastics, paper, cloth, etc.

Polyfunctional acrylates have typically been employed in photocurable coating and ink systems to enhance the rate of cure and provide the necessary film properties. While these acrylates are highly reactive and effective curing agents, they require special handling since they are highly irritating to the eyes, skin and mucous membranes and should not be inhaled in high concentrations. Work areas where these materials are employed must therefore be well ventilated. It would be highly desirable if monomers having reactivities similar to that obtained with the polyfunctional acrylates but without the aforementioned undesirable characteristics were readily available.

SUMMARY OF THE INVENTION

I have now discovered highly useful and novel monomers and oligomers obtained from the reaction of 2-vinylcyclopropane-1,1-dicarboxylic acid (or ester) and diol(s). The products of this invention are highly reactive under a variety of conditions—they can be caused to react using cationic and anionic initiators, Ziegler-Natta catalysts or with radical initiators and are useful for the preparation of photocurable films, coatings and inks. The superior reactivity of the present products is attributable, at least in part, to the fact that in addition to the reactivity of the vinyl group, the cyclopropane ring can also undergo ring opening and thus provide another site of chemical reactivity. Additionally, monomeric-/oligomeric products have low toxicity and, particularly in the case of oligomers, have low vapor pressures. The present products are further characterized as having good pigment wetting characteristics and a high degree of plasticizing efficiency.

Vinylcyclopropane monomers and oligomers of this invention conform to the general formula

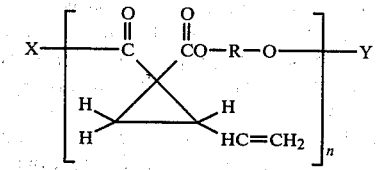

where R represents the bivalent radical of a diol or ether diol, X and Y represent the terminating groups and n is an integer from 1 to 20. The radical R is derived from a $C_{2-12}$ aliphatic diol, a $C_{3-12}$ cycloaliphatic diol, $C_{8-20}$ aromatic diols or ether diols having from 4 to about 60 carbon atoms and 1 to 30 ether moieties.

Terminal group X can be hydroxy, alkoxy, preferably having 1 to 4 carbon atoms, or the group —OROH where R represents the bivalent radical of the diol and is the same as defined above. Y is hydrogen or the radical

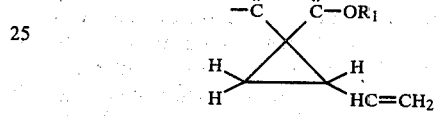

where $R_1$ is hydrogen or a $C_{1-4}$ alkyl group. Most generally the products of this invention are mixtures wherein n ranges from 1 up to about 10 with the predominant products having n=1 to 5.

DETAILED DESCRIPTION

The novel products of this invention are obtained by the reaction of 2-vinylcyclopropane-1,1-dicarboxylic acid, or lower alkyl ester thereof, with a diol. The vinylcyclopropane dicarboxylic acid or ester can be obtained by any of the known reaction procedures for condensing a 1,4-dihalobutene-2 with malonic esters. For example, the condensation can be accomplished by the classical method, i.e. reacting the dihalide with the disodio anion of the malonic ester under anhydrous conditions, or using a "phase transfer" process wherein the dihalide is reacted with malonic ester in the presence of an onium compound, an alkali metal compound and water.

The 2-vinylcyclopropane-1,1-dicarboxylic acid may be reacted (condensed) directly with the diol to produce the monomers and oligomers or, as is more commonly the case, the corresponding lower alkyl ester of 2-vinylcyclopropane-1,1-dicarboxylic acid will be reacted with the diol. Such transalcoholysis reactions are well known to the art and are readily adaptable for the preparation of the products of this invention. The monomers and oligomers may also be obtained by ester interchange. Therefore, it is intended and will be understood by those skilled in the art that wherever the vinylcyclopropane dicarboxylic acid is employed, the corresponding lower alkyl esters can also be used. Generally, $C_{1-4}$ alkyl esters and particularly methyl and ethyl esters of the 2-vinylcyclopropane-1,1-dicarboxylic acid are employed for transalcoholysis and ester-interchange procedures.

Useful diols for the preparation of the novel products of this invention include branched and straight-chain aliphatic diols, cycloaliphatic diols, aromatic diols and ether diols. As used herein, the term ether diols is intended to encompass condensation products of the aliphatic, cycloaliphatic or aromatic diols, ethoxylated and propoxylated aliphatic, cycloaliphatic or aromatic diols, and ethoxylated or propoxylated derivatives obtained from aliphatic, cycloaliphatic or aromatic polycarboxylic acids.

Aliphatic diols will contain from 2 to 12 and, more preferably, 2 to 8 carbon atoms. Cycloaliphatic diols having 3 to 12 and, more usually, 5 to 10 carbon atoms can be used. Useful aromatic diols can contain from 8 up to about 20 carbon atoms and will correspond to the general formula

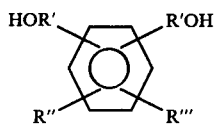

where R' represents a bivalent hydrocarbon radical of 1 to 6 carbon atoms and R'' and R''' are, independently, hydrogen, a $C_{1-4}$ alkyl group or $C_{1-4}$ alkoxy group.

The ether diols can be derived from the above-described or other aliphatic, cycloaliphatic and aromatic diols. Useful ether diols can contain from 4 up to about 60 carbon atoms and have from 1 to 30 and, more usually, 1 to 20 ether linkages within the molecule. Most generally these products are obtained from the ethoxylation or propoxylation of the diol, however, other diols or polyols can also be employed to obtain highly useful vinylcyclopropane monomers and/or oligomers.

Illustrative diols of the above types include: ethylene glycol, 1,2- or 1,3-propylene glycol, 1,2-, 1,3- or 1,4-butanediol, 1,5-pentanediol, 3-methyl-1,5-pentanediol, 2,3-dimethyl-1,4-butanediol, 2,3-dimethyl-2,3-butanediol, 1,6-hexanediol, 1,8-octanediol, 2-ethyl-1,6-hexanediol, 1,9-nonanediol, 1,10-decanediol, 1,3-cyclopentanediol, 1,2-, 1,3- or 1,4-cyclohexanedimethanol, 4-methyl-1,2-cyclohexanedimethanol, 1,5-cyclooctanediol, 1,2-, 1,3- or 1,4-benzenedimethanol, 2-nitro-p-xylene-α,α'-diol, 5-nitro-m-xylene-α,α'-diol, 4-hydroxy-3-methoxyphenethyl alcohol, and the like.

Ether diols which can be used include such compounds as diethylene glycol, dipropylene glycol, triethylene glycol, tetraethylene glycol and higher polyoxyethylene or polyoxypropylene glycols having molecular weights ranging up to about 600. Mixtures of diols of the above types can also be used for the preparation of the monomers/oligomers. Ethoxylated and propoxylated polyhydroxylated aromatics such as resorcinol, catechol, hydroquinone and bisphenols are also used to obtain useful monomeric and oligomeric products. Similarly, the reaction products of ethylene oxide or propylene oxide and aliphatic, cycloaliphatic and aromatic polycarboxylic acids are useful polyols for the preparation of the novel products of this invention. Bis(hydroxyethyl)adipate, bis(hydroxyethyl)azelate, bis(hydroxyethyl)dimerate, bis(hydroxyethyl)terephthalate and higher ethoxylates or propoxylates are illustrative of such useful ether diols and polyols.

Substantial amounts of higher polyols may also be present with the diol. Highly complex molecules are possible when higher polyols are present in substantial amounts or constitute the entire alcohol portion, however, such products can find utility in some applications. Suitable polyols for this purpose include trimethylolpropane, glycerol, pentaerythritol, dipentaerythritol, tripentaerythritol, mannitol, sorbitol and the like.

Monomers and oligomers are obtained by reacting diols of the foregoing types with 2-vinylcyclopropane-1,1-dicarboxylic acid (or ester). Typically, however, the resulting products are a mixture of monomeric and oligomeric compounds in varying amounts which is primarily determined by the molar proportions of reactants used for the reaction, the particular diol used and reaction conditions. While a large equivalents excess of either reactant may be utilized for the preparation of the novel products of this invention, most generally the diol and dicarboxylic acid (or ester) are reacted at equivalents ratios from about 2:1 to 1:2 and, more preferably, the equivalents ratio of diol: 2-vinylcyclopropane-1,1-dicarboxylic acid (or ester) will range from about 1.3:1 to 1:1.3. When operating within the above-defined equivalents ratios, the resulting products are typically transparent liquids—ranging from extremely fluid materials to highly viscous (amorphous) masses. The monomeric/oligomeric products have average molecular weights from about 200 to 15,000 and, more usually, from 300 to 6,000. They are further characterized as having viscosities (24° C.) from about 0.2 to 200 poise and, more preferably, 0.3 to 150 poise.

The fact that a mixture of oligomer and monomer is obtained does not detract from the overall utility of the products and, in fact, such products may be advantageous. For example, it is possible to modify the viscosity and other physical properties of the products by varying the composition in this manner.

Monomeric and oligomeric products of this invention correspond to the formula

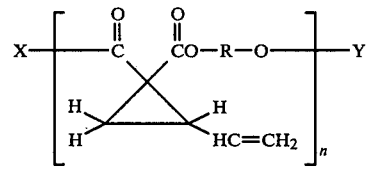

where R represents a bivalent aliphatic, cycloaliphatic or aromatic radical or radical derived from an ether diol, n is an integer from 1 (in the case of the monomer) up to about 20 and X and Y represent terminating groups. Most often for the mixed products of this invention, n will range from 1 up to about 10 with the predominant products having n=1 to 5. The terminal group X can be hydroxy, alkoxy (most generally containing from 1 to 4 carbon atoms) or the group —OROH where R is the same as defined above. Y is hydrogen or the radical

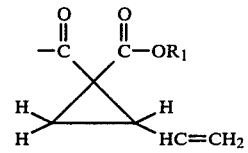

where $R_1$ is hydrogen or a $C_{1-4}$ alkyl group.

As has already been pointed out, the predominant compound(s) present in the mixtures of this invention will be governed to some extent by the molar proportions of the reactants used. For example, if a large equivalents excess of the diol or ether diol is employed a substantial amount of the product

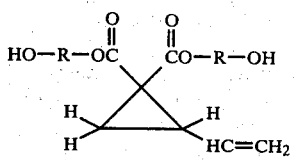

where R is the same as defined above can be present. On the other hand, if a large equivalents excess of the vinylcyclopropane dicarboxylic acid or ester is used, a substantial portion of the product will consist of

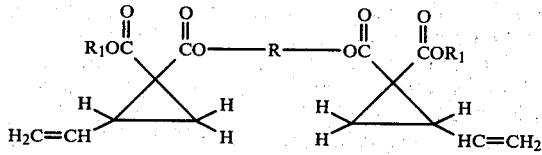

where R and $R_1$ are the same as previously defined. For the above compounds, as with the other monomeric and oligomeric products within the scope of the invention, it should be noted that various stereo isomers can also exist.

While it is not necessary for most applications for which the products of this invention can be employed, it is possible to separate the monomer and various oligomers present in the mixtures. This may be accomplished on an analytical scale employing chromatographic techniques and, in some instances, lower molecular weight fractions may be recovered or enriched in a desired component by distillation.

The vinylcyclopropane compositions of this invention are highly reactive under a variety of conditions and are useful in numerous applications where reactive monomers/oligomers are employed. They can be polymerized, by themselves and in combination with other reactive monomers, and are effective cross-linking agents in curable systems and are reactive to cationic initiators, anionic initiators, Ziegler-Natta catalysts, organic and inorganic radical initiators, photoinitiators (including ultraviolet, beta and gamma radiation), and the like. The present products are particularly advantageous since in addition to the vinyl group, the reactivity of which is widely recognized, the cyclopropane ring can also serve as a site of reactivity via ring-opening reactions. This results in exceptional reactivity under a variety of diverse reaction conditions.

While the reactivity of the monomers, oligomers and mixtures thereof is comparable and in some instances surpasses that obtained with commonly used acrylate monomers, the products of this invention are substantially less volatile and are therefore highly desirable and adaptable for use in photocurable film, coating and ink formulations. Curing may also be accomplished by means of chemical initiators with or without the addition of heat. Since these vinylcyclopropane products have low volatility and do not irritate eyes, skin and mucous membranes, they can be utilized with minimal ventilation. Furthermore, they are compatible with the commonly used solvent systems and their viscosity is such that they can be used in the absence of organic solvents. As a result of their structure, these monomers/oligomers can also serve to plasticize the resulting cross-linked coating or film and thus impart the desired flexibility thereto without the addition of external plasticizers. Still another advantage associated with the use of these vinylcyclopropane products is the ability to alter the hydrophilic/hydrophobic character of the resulting coatings and films by varying the diols used.

The versatility of the vinylcyclopropane monomers/oligomers and the numerous uses and advantages realized therewith are illustrated by the following examples. Still other benefits and uses will be evident to those skilled in the art from a reading of these examples. In the examples, all parts and percentages are given on a weight basis unless otherwise indicated.

EXAMPLE I

An aqueous solution (50%) of potassium hydroxide (168 g) was added dropwise to a vigorously stirred solution of 125 g (1.0 mol) trans 1,4-dichlorobutene-2, 80 g (0.5 mol) diethyl malonate and 3.2 g tricaprylmethylammonium chloride while maintaining the temperature at 25°–30° C. When the addition was complete, the mixture was stirred at ambient temperature for five hours and water then added to dissolve suspended salts. After separation of the phases followed by washing of the aqueous phase three times with ethyl ether, the organic portion was distilled to obtain 21.3 g diethyl 2-vinylcyclopropane-1,1-dicarboxylate. Bp 64°–66° C. (0.15 mm); $n_D^{27°}$ 1.4512; [lit. bp 69°–72° C. (0.5 mm); $n_D^{19°}$ 1.4528]. Infrared and proton nmr spectra were also consistent with the desired compound.

Equimolar amounts diethyl 2-vinylcyclopropane-1,1-dicarboxylate and 1,6-hexanediol were charged to a reactor with 0.12% dibutyltin oxide, 0.02% calcium acetate and a small amount of p-methoxyphenol inhibitor. The reaction mixture was purged with nitrogen and heated under a vacuum (150 mm Hg) with agitation. When the temperature reached about 140° C. ethanol began distilling from the reaction mixture and was collected in a distillate trap connected to the condenser. As the distillation rate slowed, the pressure was further reduced to about 95 mm Hg. When about 73% trans-alcoholysis was achieved (based on the theoretical amount of ethanol) the reaction mixture was allowed to cool to about 100° C., the vacuum broken with nitrogen, and the reaction mixture filtered to obtain a clear product having a Gardner Color of 3 and 25° C. viscosity of 4.43 poise (Gardner-Holt ASTM D1545 viscosity Q-R). The resulting vinylcyclopropane composition, which consisted predominantly of oligomers having 2 and 3 repeating units, was highly reactive.

To demonstrate the reactivity of this and other vinylcyclopropane monomers/oligomers of this invention a rapid and preliminary test was devised to determine the cure rate. For the test, two drops of the product containing .5% benzoin isobutyl ether where placed on a microscope slide. A second slide was then positioned on the first slide so that there was approximately one inch overlap, with the product being uniformly spread between the two glass plates over the entire overlapping area. The assembly was then exposed to a low intensity ultraviolet light source (the slide assembly positioned one inch under two 15 watt General Electric Blak-Ray lamps) and the length of time required to bond the plates determined. A firm tackless bond was obtained with the above-prepared vinylcyclopropane composition after only 3 seconds exposure.

A portion of the product was also combined with 0.5% azobisisobutyronitrile and placed in an 18"×7 mm glass tube and cured at 60° C. oven for 7 hours. A clear, essentially water-white flexible polymer "rope"

was obtained by carefully breaking away the glass tube. Both ends of the rope were clearly cut to provide smooth flat surfaces and one end of the rope was exposed to a standard 60 watt incandescent light source. Light was transmitted through the polymer and a circular light image projected on the surface of smooth white paper at the opposite end of the rope.

EXAMPLE II

The process of Example I was repeated on larger scale employing equimolar amounts of the reactants and the same catalyst levels, however, for this reaction samples were removed from the reactor when 25%, 50% and 65% transalcoholysis was achieved (determined from the amount of ethanol recovered). The samples were then analyzed by high pressure liquid chromatography using a size-gel column (μ STYRAGEL® 1000 A, 500 A and 100 A in series) and nuclear magnetic ransonance spectroscopy to follow the progress of oligomer formation. Weight average molecular weight of the product obtained after 25% transalcoholysis was 750. After 50% transalcoholysis (hydroxyl value 192.5) the weight average molecular weight increased to 1133. At 65% transalcoholysis (hydroxyl value 124.5 and 24° C. Brookfield viscosity 22.6 poise) the weight average molecular weight was 1798. In all instances nuclear magnetic resonance spectra confirmed the presence of the vinylcyclopropane moiety and showed no evidence of by-products formed by ring opening. The final product (65% transalcoholysis) containing 5 wt.% benzoin isobutyl ether cured in 3–4 seconds when exposed to low intensity ultraviolet light.

EXAMPLE III

Diethyl 2-vinylcyclopropane-1,1-dicarboxylate (3180 gms; 15 mols) and 1772.7 gms 1,6-hexanediol (15 mols) were charged to a reactor with 5.99 gms dibutyltin oxide and 1.19 gms calcium diacetate. The reaction mixture was heated with agitation and the temperature of the reaction mixture gradually raised to 124°–126° C. while maintaining a vacuum of 130 mm Hg. As the rate of distillate removal slowed the pressure was gradually decreased to 95 mm Hg. After about 8 hours, when about 80% transesterification had been achieved based on the amount of ethanol recovered, heating was terminated. The reaction mixture was allowed to cool and the vacuum broken with nitrogen. The final product (Gardner color less than 1, 25° C. Brookfield viscosity 16.8 poise; hydroxyl value 114.4) had a weight average molecular weight (determined by gel permeation chromatography) of 1756. While the product contained some monomer (n=1) and oligomers having more than five repeating units, it consisted predominantly of oligomeric products having 2 to 5 repeating units.

To demonstrate the ability of the product to be polymerized using cationic initiators, formulations were prepared containing 0.01% of the following initiators: boron trifluoride, p-toluenesulfonic acid and sulfuric acid. The formulations were heated at 135° C. and within 20 minutes were cured. In all instances tack-free flexible films were obtained. To further demonstrate the reactivity of the oligomeric material, 5% benzoin isobutyl ether was added thereto and photochemically cured under ultraviolet light to also provide a tack-free flexible film.

Highly reactive and useful products of varying composition, i.e., the amount of monomer and distribution of oligomers are different, are obtained when molar excesses of either reactant are employed in the process. Products obtained using either 30% equivalents excess of diethyl 2-vinylcyclopropane-1,1-dicarboxylate or 30% equivalents excess of 1,6-hexanediol are highly reactive by themselves and in combination with other reactive monomers and can be rapidly cured using chemical or photoinitiation systems.

EXAMPLE IV

In a manner similar to that described in Example I, equimolar amounts of dimethyl 2-vinylcyclopropane-1,1-dicarboxylate and poly(propylene glycol) having an average molecular weight of about 400 were combined with 0.4 wt. percent dibutyltin diacetate catalyst. The reaction mixture was heated to 199°–200° C. while removing methanol. After about 5 hours, 8 gms of methanol was recovered. The reactor and its contents were then cooled to about 140° C. and a vacuum applied to remove any remaining methanol. The mixed monomeric/oligomeric product obtained after work up of the reaction mixture was evaluated in the cure test and gave a firm tackless bond after only 5 seconds exposure to ultraviolet light.

EXAMPLE V

Ethylene glycol (0.2 mols) and dimethyl 2-vinylcyclopropane-1,1-dicarboxylate (0.2 mols) were combined with 0.1 gms dibutyltin diacetate and 0.1 gms hydroquinone. The temperature was gradually raised to 185° C. over a 3 hour period and then maintained for an additional 4½ hours during which time about 3.2 gms methanol was collected. The temperature was then reduced to about 80° C. and a vacuum (0.1 mm Hg) pulled on the system to remove final traces of volatile products. The resulting light viscous oil (38.5 gms) contained some monomeric product but consisted primarily of oligomeric products of up to about 5 repeating units. A portion of the product containing 5% benzoin isobutyl ether was spread on a glass plate and upon irradiation with an ultraviolet light source provided a transparent, tack-free, resilient polymer film. Similar products are obtained when 2-vinylcyclopropane-1,1-dicarboxylic acid is esterified with ethylene glycol and diethylene glycol.

EXAMPLE VI

Five mols poly(ethylene glycol) having an average molecular weight of about 200 and 5 mols diethyl 2-vinylcyclopropane-1,1-dicarboxylate were combined with 2.5 gms dibutyltin oxide, 0.5 gms calcium acetate and about 0.1% p-methoxyphenol. The reaction mixture was heated at 145°–151.5° C. while removing ethanol, and after 73% of the theoretical amount of ethanol was recovered, the reaction was terminated. The resulting oligomeric product had a Gardner color less than 1, 25° C. viscosity of 27 poise and cured in 3 seconds.

To further demonstrate the utility of the vinylcyclopropane monomers/oligomers of this invention and to illustrate some of the advantages of these products over presently available commercial acrylate monomers, the following experiment was conducted. To the vinylcyclopropane product prepared above and to a commercial acrylate monomer [poly(ethylene glycol) 200 diacrylate], which is widely promoted for use in photocurable systems, was added 2% benzoin isobutyl ether. The solutions were then placed in 6 mm silicon-treated glass tubes to a height of 500 mm. The tubes were then exposed to low intensity utraviolet light for 1½ hours.

Whereas 4% shrinkage was obtained with the commercial diacrylate monomer during the cure, there was no shrinkage with the oligomeric vinylcyclopropane product of this invention. The ability to polymerize with zero shrinkage is highly desirable for the production of strain-free composites, binders and potting formulations.

The ability of these monomers/oligomers to be reacted with other reactive compounds was demonstrated by combining 4.5 gms of the aboveprepared vinylcyclopropane product with 10 gms diacrylate of ethoxylated bisphenol A and 5 gms diacrylate of poly(ethylene glycol) 200. Two percent benzoin isobutyl ether was added and the material spread on a steel plate (2"×6"×1/16") and cured for 25 seconds under a 100 watt high pressure mercury lamp in a nitrogen atmosphere. A tack-free, highly resilient and flexible film which did not crack or pull away from the steel sheet upon flexing was obtained.

Products exhibiting comparable reactivity are obtained when the reaction is repeated using bis(hydroxyethyl)terephthalate and ethoxylated (5 EO) bisphenol A.

EXAMPLE VII

To demonstrate the ability to prepare useful vinylcyclopropane monomeric/oligomeric products under a variety of conditions the following experiments were conducted: For the first reaction, 0.25 mol poly(ethylene glycol) 200 and 0.25 mol dimethyl 2-vinylcyclopropane-1,1-dicarboxylate were combined with 0.5 gm condensed butyl titanate catalyst. The mixture was heated with agitation and 9 gms methanol removed over a period of approximately one hour. This corresponds to approximately 60 percent transalcoholysis. For the second reaction, 0.25 mol poly(ethylene glycol) 200 and 0.25 mol diethyl 2-vinylcyclopropane-1,1-dicarboxylate were combined and reacted in the presence of 0.5 gm dibutyltin diacetate. The reaction was conducted while removing ethanol to approximately 72% transalcoholysis.

Products from both of these reactions were predominantly oligomers of 2-3 repeating units. The viscous fluids were highly reactive and cured in less than 5 seconds upon exposure to ultraviolet light.

EXAMPLE VIII

A highly reactive and useful vinylcyclopropane monomeric/oligomeric product was obtained from the transalcoholysis reaction of tetraethylene glycol and diethyl 2-vinylcyclopropane-1,1-dicarboxylate employing sodium ethoxide. The sodium ethoxide was formed by reacting 1 gm sodium metal with anhydrous ethanol in benzene. Diethyl 2-vinylcyclopropane-1,1-dicarboxylate (776 gms), 706 gms tetraethylene glycol and 1 gm p-methoxy phenol were then added to the sodium ethoxide/benzene solution (approximately 500 mls benzene). The reaction mixture was heated at reflux while slowly removing the ethanol-benzene azeotrope. Benzene was replaced as required during the course of the reaction until approximately 55% transesterification was achieved, at which point the reaction was terminated and the reaction product worked up. The resulting oligomeric/monomeric product containing 5% benzoin isobutyl ether gave a rapid cure upon exposure to ultraviolet radiation.

EXAMPLE IX 1,4-Cyclohexane dimethanol (14.4 gms) was combined with 21.2 gms diethyl 2-vinylcyclopropane-1,1-dicarboxylate and 0.2 gm dibutyltin diacetate. The mixture was heated at 145°–150° C. under a moderate vacuum for ½ hour and a high vacuum was then applied to remove the final traces of ethanol. Twenty-five grams highly viscous liquid containing predominantly oligomeric products having 2 to 4 repeating units was obtained. The product (containing 5% benzoin butylether) cured in 3 seconds upon exposure to ultraviolet light. A thin film was cast in a Teflon-coated mold and, after curing, provided a clear, tack-free flexible film.

EXAMPLE X

Diethyl 2-vinylcyclopropane-1,1-dicarboxylate (0.1 mol) and p-xylene-α,α'-diol (0.1 mol) were combined and reacted at 150° C. under reduced pressure in the presence of 0.5 gm dibutyltin diacetate. The resulting composition, which consisted of a mixture of both monomeric and oligomeric products, had excellent reactivity and was readily cured upon exposure to ultraviolet light and other photoinitiation sources.

I claim:

1. Vinylcyclopropane monomers and oligomers of the formula

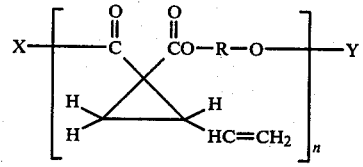

wherein R is a bivalent radical derived from a $C_{2-12}$ aliphatic diol, $C_{3-12}$ cycloaliphatic diol, $C_{8-20}$ aromatic diol or ether diol having from 4 to 60 carbon atoms and 1 to 30 ether moieties, n is an integer from 1 to 20, X is hydroxy, alkoxy or the group —OROH where R is a bivalent radical as defined above and Y is hydrogen or the radical

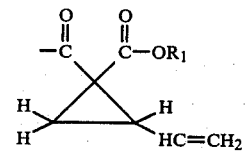

where $R_1$ is hydrogen or a $C_{1-4}$ alkyl group.

2. The vinylcyclopropane monomers and oligomers of claim 1 where n is an integer from 1 to 10.

3. The vinylcyclopropane monomers and oligomers of claim 1 which is a mixture of monomeric and oligomeric products and wherein the predominant products have n equal to 1 to 10.

4. The vinylcyclopropane monomers and oligomers of claim 3 wherein X is hydroxy, alkoxy or the group —OROH where R is a bivalent radical derived from a $C_{2-12}$ aliphatic diol, $C_{3-12}$ cycloaliphatic diol, $C_{8-20}$ aromatic diol or ether diol having from 4 to 60 carbon atoms and 1 to 30 ether moieties and Y is hydrogen or the radical

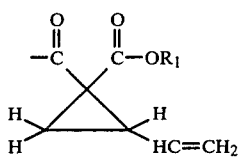

where $R_1$ is hydrogen or a $C_{1-4}$ alkyl group.

5. The vinylcyclopropane monomers and oligomers of claim 2 or 4 further characterized by having an average molecular weight from 200 to 15000 and 24° C. viscosity of 0.2 to 200 poise.

6. The vinylcyclopropane composition of claim 5 wherein the average molecular weight is 300 to 6000 and viscosity is 0.3 to 150 poise.

7. The vinylcyclopropane monomers and oligomers of claim 1 having a 24° C. viscosity from 0.3 to 150 poise and obtained by transalcoholysis of a $C_{1-4}$ alkyl ester of 2-vinylcyclopropane-1,1-dicarboxylic acid with a diol selected from the group consisting of $C_{2-12}$ aliphatic diols, $C_{3-12}$ cycloaliphatic diols, $C_{8-20}$ aromatic diols or ether diols having from 4 to 60 carbon atoms and 1–30 ether moieties, the respective reactants present in an equivalents ratio from 2:1 to 1:2.

8. The vinylcyclopropane monomers and oligomers of claim 7 wherein the equivalents ratio of the reactants is from 1.3:1 to 1:1.3.

9. The vinylcyclopropane monomers and oligomers of claim 8 obtained by the transalcoholysis reaction of essentially stoichiometric amounts of dimethyl 2-vinylcyclopropane-1,1-dicarboxylate or diethyl 2-vinylcyclopropane-1,1-dicarboxylate and a $C_{2-8}$ aliphatic diol, a $C_{5-10}$ cycloaliphatic diol; an aromatic diol of the formula

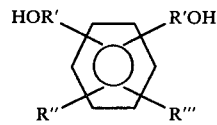

where $R'$ is a bivalent hydrocarbon radical of 1 to 6 carbon atoms and $R''$ and $R'''$ are hydrogen, a $C_{1-4}$ alkyl or $C_{1-4}$ alkoxy radical, or an ether diol having 1 to 20 ether linkages in the molecule.

* * * * *